(12) United States Patent
Srivastava et al.

(10) Patent No.: US 6,845,499 B2
(45) Date of Patent: Jan. 18, 2005

(54) SYSTEM AND METHOD FOR DEVELOPING SOFTWARE APPLICATIONS USING AN EXTENDED XML-BASED FRAMEWORK

(75) Inventors: Aditya Srivastava, Plano, TX (US); Giridhar Tandri, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 672 days.

(21) Appl. No.: 09/773,685

(22) Filed: Jan. 31, 2001

(65) Prior Publication Data

US 2003/0018951 A1 Jan. 23, 2003

(51) Int. Cl.⁷ .............................................. G06F 9/44
(52) U.S. Cl. ...................................... 717/100; 717/116
(58) Field of Search ................................ 717/100–108, 717/114–117, 120, 127; 715/501.1, 513

(56) References Cited

U.S. PATENT DOCUMENTS 5,845,119 A * 12/1998 Kozuka et al. ............. 717/107
6,598,219 B1 * 7/2003 Lau ............................ 717/108

OTHER PUBLICATIONS

Lee et al. XML–based Retrieval of Object–Oriented Frameworks. IEEE. 2000. pp. 2953–2958.*
Wollschlaeger. A Framework for Fieldbus Management Using XML Description. IEEE. 2000. pp. 3–10.*
Ho et al. An Efficient Framework for Business Software Development. IEEE. 2003. pp. 336–343.*
Sabharwal. U.S. patent application Publication 2003/0167456.*
Tilden et al. U.S. patent application Publication. 2002/0129345.*
Delcambre et al. U.S. patent application Publication. 2002/0059566.*

* cited by examiner

Primary Examiner—Wei Y. Zhen
(74) Attorney, Agent, or Firm—Baker Botts L.L.P.

(57) ABSTRACT

An XML-based framework (30) for developing software applications (12) includes a document manager (32) to manage activities relating to one or more XML-based data documents (34) associated with an application (12), each data document (34) modeling data associated with the application (12) and representing relationships between the data document (34) and one or more other data documents (34). The framework (30) includes a rules manager (36) to manage rules (38) specifying logic for handling notifications associated with XML-based action documents (34) received at the application (12), the notifications requesting actions involving data documents (34). The framework (30) also includes an operations manager (40) to manage the execution of transactions involving data documents (34) based on operations (42) defined for the application (12) during its development. The framework (30) provides a generic XML-based transaction engine, the application (12) being one of a plurality of distributed applications (12) each being an instance of the generic transaction engine. An electronic marketplace with a distributed transaction layer may include such a plurality of distributed applications (12), where the applications (12) interact with one another using the distributed transaction layer (14) to conduct electronic commerce within the marketplace.

57 Claims, 3 Drawing Sheets

SYSTEM AND METHOD FOR DEVELOPING SOFTWARE APPLICATIONS USING AN EXTENDED XML-BASED FRAMEWORK

TECHNICAL FIELD OF THE INVENTION

This invention relates in general to software development and in particular to a system and method for developing software applications using an extended XML-based framework.

BACKGROUND OF THE INVENTION

As the commercial significance of the Internet increases, business-to-consumer ("B2C"), business-to-business ("B2B"), and other electronic marketplaces have become increasingly prevalent. Each marketplace typically requires a different set of software applications to provide the capabilities that users of the marketplace expect, some being common to many marketplaces and some being customized to particular marketplaces. Previous techniques for developing such applications have required each application to be developed essentially from scratch, requiring extensive programming resources for defining the particular way in which it handles data, the particular rules that control its operation, and the particular communications between it and other applications or other external systems. This makes development of electronic marketplaces relatively slow and expensive. The applications must typically be tightly coupled to one another, which not only makes it difficult to modify applications, but leads to performance penalties in addition. As a result of the time and expense associated with creating and modifying electronic marketplaces, companies that develop such marketplaces for their customers are typically forced to use a "one size fits all" approach to marketplace development, with little if any variation between customers. This lack of customization may often lead to poorer customer satisfaction and other negative consequences. Any of these or other deficiencies have made previous techniques for developing applications, such as those associated with electronic marketplaces, inadequate for many needs.

SUMMARY OF THE INVENTION

According to the present invention, problems and disadvantages associated with previous techniques for developing software applications have been substantially reduced or eliminated.

In one embodiment of the present invention, a framework for developing software applications includes a document manager to manage activities relating to one or more XML-based data documents associated with an application, each of the data documents modeling data associated with the application and representing relationships that may exist between the data document and one or more other data documents. The framework includes a rules manager to manage rules specifying logic for handling notifications associated with XML-based action documents that are received at the application, the notifications requesting actions involving data documents. The framework additionally includes an operations manager to manage the execution of transactions involving data documents according to one or more operations defined for the application during its development. The framework provides a generic XML-based transaction engine, the application being one of multiple distributed applications each being an instance of the generic transaction engine.

Another embodiment of the present invention relates to an XML-based software application developed using such a framework and including a document manager, rules manager, and operations manager as described above. The application may be one of multiple distributed applications, each being an instance of such a generic transaction engine. In another embodiment of the present invention, such distributed applications may be incorporated in an electronic marketplace having a distributed transaction layer. The applications interact with one another using the distributed transaction layer of the marketplace to conduct electronic commerce within the marketplace. The distributed transaction layer may provide communications between the applications in XML over HTTP format.

The present invention provides a number of technical advantages over previous techniques. The present invention provides an framework based on extensions to XML that allows software applications to be developed in a highly modular, loosely coupled, and distributed manner. These applications may be developed and modified relatively rapidly in comparison to previous techniques, resulting in shorter product development cycles, faster times to market, and more responsiveness to changing market conditions. Developers, domain experts, consultants, or other persons may define documents, rules, operations, and other aspects of these applications using XML, which is widely known and relatively easy to learn. Very low application maintenance costs may be achieved because the rules can be extended and modified with little or no programming. These benefits may also free up programming resources for other, perhaps more productive, tasks.

Applications created according to the present invention may be deployed in a "plug and play" manner to construct complex transactional systems that are customized for a particular website, electronic marketplace, or another suitable environment. This approach may result in greater "customer satisfaction," since an application can be built to focus on specific needs rather than relying upon a "one solution fits all" approach. Such systems may be readily configured to allow applications to operate in a peer-to-peer, master-slave, hub-and-spoke, or other suitable architecture. The applications may reside locally, in association with the system, or remotely, in association with one or more other systems. The distribution of applications is accommodated transparently, without requiring the application developer to know where other applications, data, or other components reside in developing the application. The distributed and seamless architecture may provide significant performance and scalability benefits. Moreover, because applications may communicate information using almost ubiquitous XML over HTTP, they may be readily integrated into existing systems.

Systems and methods incorporating one or more of these or other advantages are well suited for modem commercial environments such as those associated with Internet websites or electronic marketplaces. Other technical advantages are readily apparent to those skilled in the art from the following figures, descriptions, and claims.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF THE INVENTION

Figure 1:
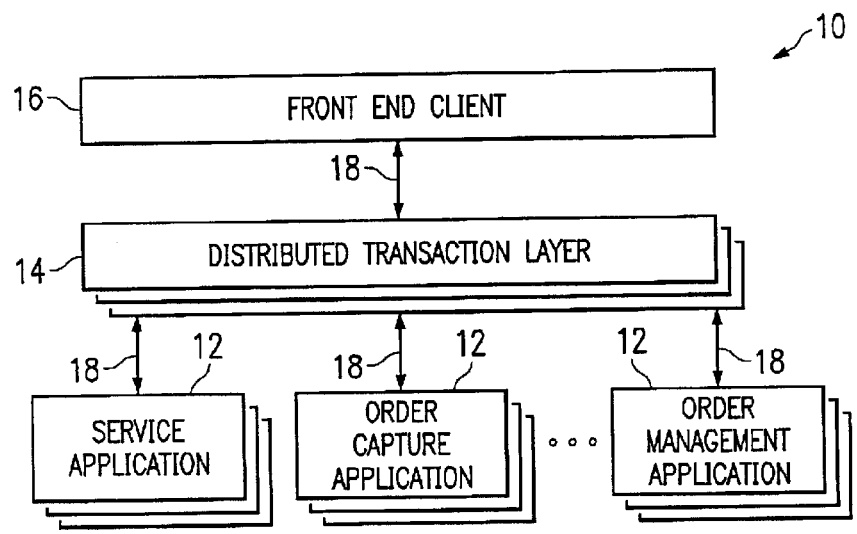
FIG. 1 illustrates an exemplary system for developing software applications using an extended XML-based framework.

FIG. 1 illustrates an exemplary system 10 that includes one or more modular software applications 12 development using an extended XML-based framework. In general, applications 12 communicate with one another and with a front end client 14 using a distributed transaction layer 14 to provide one or more suitable capabilities associated with a front end client 16. Front end client 16 may be associated with any appropriate website, electronic marketplace facilitating business-to-business ("B2B"), business-to-consumer ("B2C"), or other transactions, or other suitable system operating to provide information to or facilitate transactions with one or more users of front end client 16. Applications 12, transactions layer 14, and front end client 16 may be coupled to each other using links 18 that each include one or more local area networks (LANs), metropolitan area networks (MANs), wide area networks (WANs), portions of a global computer network such as the Internet, or any other wireline, wireless, or other links. Although applications 12 are discussed, the present invention contemplates applications, modules, engines, programs, or any other software components.

In one embodiment, applications 12 and front end client 16 communicate with each other, using transaction layer 14, in Extensible Markup Language (XML) format. Although XML documents are primarily described, the present invention contemplates any appropriate document, file, page, or other data representation. Therefore, reference to a document or documents is intended to encompass all such representations, where appropriate, and should not be construed to limit the scope of invention to a particular representation. In one embodiment, the XML documents are requested, retrieved, and returned according to Hypertext Transfer Protocol (HTTP) messages, where each such HTTP message identifies a stored XML document according to its Uniform Resource Locator (URL) or other suitable address. Communication of XML documents among entities in Internet and other web-based environments is well known to those skilled in the art. Use of XML over HTTP for communications between applications 12 and front end client 16 may contribute to a modular, loosely coupled, distributed nature of the applications 12, allowing applications 12 to be incorporated into a marketplace or other environment in a "plug and play" manner according to particular needs. Front end client 16 may use XML output from applications 12 to generate pages for display to users as appropriate.

Applications 12 may include one or more service applications 12, order capture applications 12, order management applications 12, or any other suitable applications 12, depending on the environment for which applications 12 are developed. In a particular embodiment associated with a B2B marketplace, service applications 12 may include a catalog application 12, a pricing application 12, a contract application 12, a user profile application 12, or any other appropriate application 12 relating to the services that the marketplace might provide to its users. Order capture applications 12 may include an ordering application 12, an auction application 12, a requisition application 12, a direct procurement application 12, or any other suitable application 12 relating to the handling of orders received buyers. Order management applications 12 might include an order administration application 12, a return manager application 12, a settlement application 12, or any other appropriate application 12 relating to the management of one or more aspects of transactions involving buyers and sellers. The present invention contemplates any appropriate applications 12 being developed according to the extended XML-based framework described more fully below with respect to FIG. 2.

Applications 12, transaction layer 14, and front end client 16 may operate on one or more computer systems at one or more locations. Each of these components may share one or more computers or any other resources with one or more other components, for example, in association with the same website or electronic marketplace. Further, although described primarily as separate components, applications 12, transaction layer 14, and front end client 16, or any combination of two or more of these components may be implemented in whole or in part using one or more common software components, as appropriate. In one embodiment, applications 12 and the framework on which they are developed may be deployed on any appropriate system, due in part to the fact that they are based upon XML.

Figure 2:
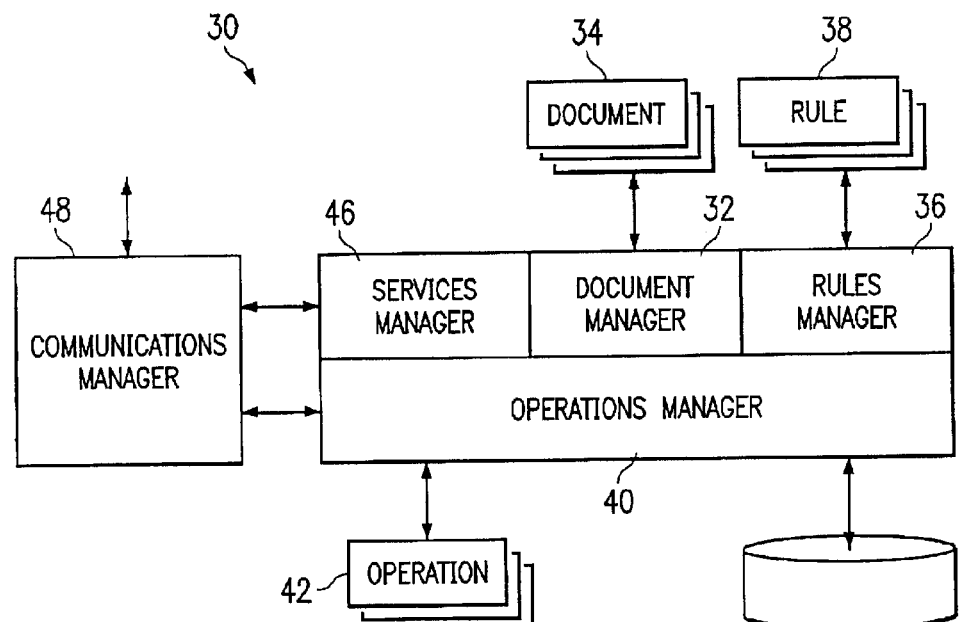
FIG. 2 illustrates an exemplary extended XML-based framework for use in developing software applications.

FIG. 2 illustrates an exemplary extended XML-based framework 30 for use in developing applications 12. In one embodiment, framework 30 provides a generic transaction engine. Each application 12 developed using framework 30 is an instance of the engine created according to input received from an application developer, including dynamic logic and schema to configure the engine for particular needs. In general, the framework 30 provides extensions to standard XML that allow developers to leverage their familiarity with XML, which is commonly used for data interchange, in defining data and actions on that data associated with complex systems. This present invention may be particularly advantageous with respect to development of B2B, B2C, or other electronic marketplaces, when accommodating business process workflows is deemed more important than providing planning, optimization, or other more computationally intensive capabilities.

In one embodiment, framework 30 includes a document manager 32 to manage the creation, storage, and modification of documents 34 received from a developer in developing application 12. Documents 34 may include data documents 34 and action documents 34. In general, a data document 34 models data associated with application 12 and represents the relationship, if any, between data document 34 and one or more other documents 34. An action document 34 allows an external system to notify a data document 34 in order to request a suitable action involving the data document 34. If a notification is valid based on one or more defined rules (described more fully below), then the request is fulfilled and the action is executed. If the notification is not valid based on the rules, then an error message or other indicator is returned to the external system that issued the notification.

For example, a definition of a data document 34 for a purchase order might be provided as follows:

```
<DOCUMENT Name="PURCHASE_ORDER">
    <PROPERTY Name="ID" Type="string" PrimaryKey="yes" />
    <PROPERTY Name="BUYER_ID" Type="string" />
    <PROPERTY Name="CREATED_BY" Type="string" />
    <PROPERTY Name="MKP" Type="string" />
    <PROPERTY Name="CREATION_DATE" Type="date" />
    <PROPERTY Name="DEF_SHIP_TO" Type="string" />
    <PROPERTY Name="DEF_BILL_TO" Type="string" />
    <PROPERTY Name="INVOICE" Type="string" />
    <PROPERTY Name="ORDER_STATE" Type="string" />
    <PROPERTY Name="COMMENTS" Type="string" />
    <DOCUMENTLINK Name="LINE_ITEMS"
        LinkedDocument="LINE_ITEM" AutoDelete="yes">
        <MAP_PROPERTY To="PO_ID" From="ID"/>
    </DOCUMENTLINK>
    <DOCUMENTLINK Name="BUYER_INFO"
        Linked Document="PROFILE">
        <MAP_PROPERTY To="ID" From="BUYER_ID" />
    </DOCUMENTLINK>
</DOCUMENT>
```

As this example indicates, a data document definition may include one or more attributes the data document 34 may contain and the data types of these attributes. The definition may also specify the links (relationships) between the data document 34 and one or more other documents 34. In this example, the PURCHASE_ORDER document 34 is linked to (has relationships with) the LINE_ITEM and PROFILE documents 34 using a DOCUMENTLINK tag. The present invention contemplates any suitable data documents 34 and any suitable relationships between data documents 34 and other documents 34, in accordance with particular needs.

A document 34 may reside at any suitable location. For example, document 34 may be local to a website, marketplace, or other environment with which an application 12 using document 34 is associated. Alternatively, document 34 may reside remote from such an application, for example, local to another website, another marketplace, or any other remote location. According to the present invention, document 34 may be freely accessible to any appropriate applications 12, which helps allow applications 12 to be developed in a modular, loosely coupled, and distributed manner. For example, and not by way of limitation, a developer of a requisition application 12 may define a catalog document 34 as being "remote" but treat document 34 as if it were part of requisition application 12. During deployment of application 12, the developer or other personnel may simply specify the URL or other address of a suitable catalog service supporting document 34. In addition to allowing applications 12 to be more readily distributed in nature, this frees the developer from concerning himself with at least some details that may greatly slow the application development process. Applications 12 may determine such an address during their operation, substantially on the fly, using a locator service associated with the same or a different application 12.

As discussed above, action documents 34 allow other applications 12 or other external systems to notify data documents 34 in order to request actions involving the data documents 34. During development of an application 12, developers may define action documents 34 to expose the appropriate application program interfaces (APIs), methods, or other suitable software elements according to particular needs. The action documents 34 allow developers to define the particular notifications that applications 12 are capable of understanding and will receive from external systems.

For example, a "SendASNInfo" action document 34 may be defined as follows, allowing a seller to send an "Advance Shipment" notification (ASN) to application 12 such as an order management application 12:

```
<?xml version="1.0" encoding="UTF-8"?>
<OMS_REQUEST>
    <!--raised when seller provides ASN Info -->
    <SEND_NOTIFICATION Name="SendASNInfo" Role="seller">
        <FOR_DOCUMENT Name="SHIPMENT">
            <DOCUMENT_CONTEXT>
                <ID Value="s-001"/>
            </DOCUMENT_CONTEXT>
            <UPDATE_PROPERTIES>
                <ASN_SHIP_DATE Value="07/22/00 12:00"/>
                <ASN_DATE Value="07/15/00 15:00"/>
                <ASN_NUMBER Value="001-423-xxxx"/>
                <ASN_NOTES Value="No Delay Expected"/>
            </UPDATE_PROPERTIES>
        </FOR_DOCUMENT>
    </SEND_NOTIFICATION>
</OMS_REQUEST>
```

Framework 30 may include a rules manager 36 to manage the creation, storage, execution, and modification of rules 38 that are defined during the development of an application 12. Rules 38 specify the logic for handling of notifications associated with action documents 34. One or more rules 38 may be defined for each notification, each rule 38 including a condition and an action. If application 12 receives a notification, application 12 applies each associated rule 38 to the notification. If the condition of a rule 38 is satisfied, then the action statements will be executed. For example only and without limitation, execution of an action statement may cause: (1) a state transition to occur; (2) one or more attributes of an associated document 34 to be set; (3) another document 34 to be created, retrieved, modified, deleted, or otherwise acted upon; (4) a notification to be sent to application 12 or to another application 12 in the same or a different system; (5) a timer, alert, or other message to be sent to a system component, personnel, or other entity; (6) another rule 38 to be invoked; or (7) any other suitable action to occur. In one embodiment, actions are defined using operations as described more fully below. If the condition of rule 38 is not satisfied, then an error message or other indicator is returned to the external system that issued the notification.

An exemplary rule 38 to handle a "SendASNInfo" notification described above might be defined as follows:

```
<DEFINE_NOTIFICATION Name="SendASNInfo">
 - <RULE>
    - <COND>
        <NOT_EMPTY Property="ASN_DATE" />
        <NOT_EMPTY Property="ASN_SHIP_DATE" />
        <NOT_EMPTY Property="ASN_NUMBER" />
        <NOT_EMPTY Property="ASN_NOTES" />
        <EQUAL Property="SHIPMENT_STATE"
            ToValue="Seller Acknowledged" />
    </COND>
    - <ACTION>
        <SET Property="SHIPMENT_STATE" FromValue="Asn Sent" />
        <SAVE DocVar="thisDoc" />
      - <ADD_DOCUMENT Name="ALERT">
            <FROM_USER Property="SELLER_ID" />
            <TO_USER Property="BUYER_ID" />
            <ALRT_LEVEL Value="SHIPMENT" />
            <PO_ID Property="PO_ID" />
            <SO_ID Property="SO_ID" />
            <LI_ID Property="LI_ID" />
            <SH_ID Property="ID" />
```

-continued

```
      <MSG Value="ASN notice sent by the seller" />
    </ADD_DOCUMENT>
  </ACTION>
 </RULE>
</DEFINE_NOTIFICATION>
```

Framework 30 may include operations manager 40 to manage the execution of transactions involving documents 34, based on certain operations 42 defined during the development of the associated application 12. If an operation 42 is determined to be illegal based on one or more criteria, then an error message may be returned. In one embodiment, each operation 42 for a document 34 may be represented as a static XML document with its own XML tag, but this approach may result in the proliferation of XML tags. Hence, operations 42 are preferably based on a dynamic XML structure in which an operation 42 is packaged in a REQUEST tag and either returns results in a RESULT tag (containing a return value, for example) or returns an error message in an ERROR tag. Although operations 42 may be defined to support any appropriate action with respect to documents 34, operations 42 typically include at least operations 42 for creating, retrieving, modifying, and deleting documents 34. In general, these operations 42 are made available when document 34 is defined, and provide a rich XML interface for interacting with document 34. If the operations 42 provided through framework 30 are insufficient for a particular need, framework 30 may allow the developer to access JAVA or any other development capabilities to program for the particular need using traditional techniques. The operations manager 40 may access persistent or other data storage 44 at one or more locations, as appropriate.

For example, again in the context of a purchase order, an ADD_DOCUMENT operation 42 for creating a new document 34 may have the following structure:

```
REQUEST:
<?xml version="1.0" encoding="UTF-8"?>
<OMS_REQUEST>
    <ADD_DOCUMENT Name="PURCHASE_ORDER">
        <BUYER_ID Value="Buyer01"/>
        <CREATED_BY Value="Buyer01 Agent"/>
        <MKP Value="Trade Matrix"/>
        <CREATION_DATE Value="11/30/2000 8:23:51"/>
        <DEF_SHIP_TO Value="buyer01"/>
        <DEF_BILL_TO Value="buyer01"/>
        <COMMENTS Value="Test Sample to create nested documents"/>
        <CHILD_DOCUMENT Name="LINE_ITEM">
            <ITEM_ID Value="item003"/>
            <ITEM_NAME Value="PC Card">
            <SELLER_ID Value="supplier01"/>
            <REQ_QUANTITY Value="90"/>
            <PRICE Value="50.00"/>
            <CURR Value="Dollar"/>
            <BILL_TO Value="buyer01"/>
            <REQ_SHIP_DATE Value="11/30/2000 8:23:51"/>
            <SHIP_TO Value="buyer01"/>
            <CHILD_DOCUMENT Name="SHIPMENT">
              <P_QUANTITY Value="20"/>
              <P_SHIP_DATE Value="11/30/2000 8:23:51"/>
            </CHILD_DOCUMENT>
            <CHILD_DOCUMENT Name="SHIPMENT">
              <P_QUANTITY Value="20"/>
              <P_SHIP_DATE Value="11/30/2000 8:23:51"/>
            </CHILD_DOCUMENT>
            <CHILD_DOCUMENT Name="SHIPMENT">
```

-continued

```
              <P_QUANTITY Value="30"/>
              <P_SHIP_DATE Value="11/30/2000 8:23:51"/>
            </CHILD_DOCUMENT>
        </CHILD_DOCUMENT>
        <CHILD_DOCUMENT Name="LINE_ITEM">
            <ITEM_ID Value="item002"/>
            <ITEM_NAME Value="128 MB RAM"/>
            <SELLER_ID Value="supplier02"/>
            <REQ_QUANTITY Value="120"/>
            <PRICE Value="100.00"/>
            <CURR Value="Dollar"/>
            <BILL_TO Value="buyer01"/>
            <REQ_SHIP_DATE Value="11/30/2000 8:23:51"/>
            <SHIP_TO Value="buyer01"/>
            <CHILD_DOCUMENT Name="SHIPMENT">
              <P_QUANTITY Value="60"/>
              <P_SHIP_DATE Value="11/30/2000 8:23:51"/>
            </CHILD_DOCUMENT>
            <CHILD_DOCUMENT Name="SHIPMENT">
              <P_QUANTITY Value="60"/>
              <P_SHIP_DATE Value="11/30/2000 8:23:51"/>
            </CHILD_DOCUMENT>
        </CHILD_DOCUMENT>
    </ADD_DOCUMENT>
</OMS_REQUEST>
RESPONSE:
For successful execution of request:
<?xml version="1.0" encoding="UTF-8"?>
<OMS_RESULT>
    <MESSAGE Description="Request successful"/>
    <FOR_DOCUMENT Name="PURCHASE_ORDER">
        <DOCUMENT_CONTEXT>
            <ID Value="001"/>
        </DOCUMENT_CONTEXT>
    </FOR_DOCUMENT>
</OMS_RESULT>
```

As this example indicates, the request submitted to operations manager 40 may have a nested structure including a parent document 34 and one or more child documents 34 (indicated using CHILD_DOCUMENT tags). This exemplary PURCHASE_ORDER document 34 contains two nested LINE_ITEM child documents 34, the first involving three shipments and the second involving two shipments. The response from operations manager 40 contains an internally generated identifier for the new document 34 or may contain an error message, if appropriate.

OnPreCreate and OnPostCreate rules 38 may be defined for each document type and invoked each time a document 34 of that type is created, these rules 38 providing handles for the application developer to control the document creation process. In one embodiment, the ADD_DOCUMENT operation 42 initiates a call from the operations manager 40 to an OnPreCreate rule 38 specified for the particular document type. If an OnPreCreate rule 38 is defined, rule 38 may be used to associate a system-generated ID with the document 34 being created, for example, PURCHASE_ORDER document 34. In addition, or instead, OnPreCreate rule 38 may be used to set one or more additional properties of a child document 34 based on properties of its parent document 34. For example, the OnPreCreate handler for a LINE_ITEM child document 34 might set its PO_ID property in accordance with the ID property of its PURCHASE_ORDER parent document 34.

Once it has been created, the document 34 is stored and operations manager 42 may initiate a call to an OnPostCreate rule 38 specified for the document type. If an OnPostCreate rule 38 is defined, the rule 38 may be used to create one or more related documents 34. For example, one or more SALES_ORDER documents 34 might be created in response to the OnPostCreate rule 38 associated with PURCHASE_ORDER document 34. In addition, or instead, OnPostCreate rule 38 may be used to send out e-mail, page, or other appropriate notifications, for example, that indicate the creation of SALES_ORDER document 34. If no OnPreCreate rule 38 is defined, document 34 may simply be saved and any defined OnPostCreate rule 38 then triggered. In a particular embodiment, OnPreCreate and OnPostCreate rules 38 are triggered during execution of ADD_DOCUMENT operation 42 and are not called directly by other applications 12 or external systems such as front end client 16.

An exemplary DELETE_DOCUMENT operation 42 for deleting a document 34, again in the context of a purchase order, may have the following structure:

```
REQUEST:
<?xml version="1.0" encoding="UTF-8"?>
<OMS_REQUEST>
    <DELETE_DOCUMENT Name="PURCHASE_ORDER">
        <BUYER_ID Value="WALMART"/>
        <ID Value="WLMRT001"/>
    </DELETE_DOCUMENT>
</OMS_REQUEST>
RESPONSE:
For successful execution of request:
<?xml version="1.0" encoding="UTF-8"?>
<OMS_RESULT>
    <MESSAGE Description="Request successful"/>
</OMS_RESULT>
For unsuccessful execution of request:
<?xml version="1.0" encoding="UTF-8"?>
<OMS_RESULT>
<ERROR Description="Document not found"/>
</OMS_RESULT>
```

An exemplary MODIFY_DOCUMENT operation 42 used to modify a document 34, again in the context of a purchase order, may have the following structure:

```
REQUEST:
<?xml version="1.0" encoding="UTF-8"?>
<OMS_REQUEST>
    <MODIFY_DOCUMENT Name="PURCHASE_ORDER">
        <DOCUMENT_CONTEXT>
            <BUYER_ID Value="Walmart"/>
        </DOCUMENT_CONTEXT>
        <UPDATE_PROPERTIES>
            <BUYER_ID Value="KMart"/>
        </UPDATE_PROPERTIES>
    </MODIFY_DOCUMENT>
</OMS_REQUEST>
RESPONSE:
For successful execution of request:
<?xml version="1.0" encoding="UTF-8"?>
<OMS_RESULT>
    <MESSAGE Description="Request successful">
</OMS_RESULT>
```

To identify a unique document 34, a DOCUMENT_CONTEXT tag may be used. This tag preferably contains all the elements of document 34 that uniquely identify it. A modify operation 42 may then be performed on the elements of document 34 that are within the UPDATE_PROPERTIES tag.

GET_DOCUMENT operations 42 may be used to query for and retrieve one or more documents 34 based on Boolean or other query criteria. Each operation 42 may return one or more documents 34. Several examples of query criteria might include, without limitation:

| Criterion | Example |
|---|---|
| Less than | <CREATION_DATE Value="05/30/2000 12:31:50" MatchBy="<"/> |
| Greater than | <CREATION_DATE Value="05/30/2000 12:31:50" MatchBy=">"/> |
| Starts with (for partial match) | <ITEM_NAME Value="Muffler" MatchBy="~"/> |
| Exact match | <ITEM_NAME Value="Muffler" Matchby="="/> |

The following exemplary query obtains all PURCHASE_ORDER documents 34 associated with a TradeMatrix® marketplace that were created either by "Buyer01" or prior to May 30, 2000:

```
REQUEST:
<?xml version="1.0" encoding="UTF-8"?>
<OMS_REQUEST>
    <GET_DOCUMENT Name="PURCHASE_ORDER">
        <MKP Value="TradeMatrix"/>
        <OR>
            <CREATED_BY Value="Buyer01" MatchBy="="/>
            <CREATION_DATE Value="05/30/2000 12:31:50"
              MatchBy="<"/>
        </OR>
    </GET_DOCUMENT>
</OMS_REQUEST>
RESPONSE:
For successful execution of request:
<?xml version="1,0" encoding="UTF-8"?>
<OMS_RESULT>
    <MESSAGE Description="Request successful"/>
    <PURCHASE_ORDER>
        <ID Value="po-order001"/>
        <BUYER_ID Value="Buyer01"/>
        <CREATED_BY Value="Buyer01"/>
        <MKP Value="TradeMatrix"/>
        <CREATION_DATE Value="11/12/2000 7:51:23"/>
        <DEF_SHIP_TO Value="buyer01"/>
        <DEF_BILL_TO Value="buyer01"/>
        <INVOICE Value="inv001"/>
        <ORDER_STATE Value="submitted"/>
        <COMMENTS Value="Need part for computer"/>
    <PURCHASE_ORDER>
</OMS_RESULT>
```

In one embodiment, GET_DOCUMENT_LINK operations 42 allow one or more document links to be obtained for documents 34 specified in these operations 42. This may allow, among other things, the relationships between documents 34 to be readily determined. A document link represents an association between documents 34. All the valid links for a document 34 are preferably stored in its metafile. As an example, the following request returns all the LINE_ITEM documents 34 that are associated with a specified PURCHASE_ORDER document 34:

```
REQUEST:
<?xml version="1.0" encoding="UTF-8"?>
<OMS_REQUEST>
    <GET_DOCUMENT_LINK Name="PURCHASE_ORDER"
    Link="LINE_ITEM">
        <ID Value="po-order001"/>
    </GET_DOCUMENT_LINK>
</OMS_REQUEST>
RESPONSE:
For successful execution of request:
<?xml version="1.0" encoding="UTF-8"?>
<OMS_RESULT>
    <MESSAGE Description="Request successful"/>
    <LINE_ITEM>
        <ID Value="lineitem001"/>
        <PO_ID Value="po-order001"/>
        <SO_ID Value="so-order001"/>
        <ITEM_ID Value="item001"/>
        <ITEM_NAME Value="Mother board"/>
        <SELLER_ID Value="supplier01"/>
        <REQ_QUANTITY Value="40"/>
        <PRICE Value="10.00"/>
        <CURR Value="Dollar"/>
        <BILL_TO Value="buyer01"/>
        <INVOICE Value="inv001"/>
        <REQ_SHIP_DATE Value="11/23/2000 11:10:51"/>
        <SHIP_TO Value="buyer01">
        <LINE_ITEM_STATE Value="open"/>
    </LINE_ITEM>
    <LINE_ITEM>
        <ID Value="lineitem002"/>
        <PO_ID Value="po-order001"/>
        <SO_ID Value="so-order001"/>
        <ITEM_ID Value="item001"/>
        <ITEM_NAME Value="Hard drive"/>
        <SELLER_ID Value="supplier02"/>
        <REQ_QUANTITY Value="40"/>
        <PRICE Value="10.00"/>
        <CURR Value="Dollar"/>
        <BILL_TO Value="buyer01"/>
        <INVOICE Value="inv001"/>
        <REQ_SHIP_DATE Value="11/23/2000 11:10:51"/>
        <SHIP_TO Value="buyer01"/>
        <LINE_ITEM_STATE Value="open"/>
    </LINE_ITEM>
</OMS_RESULT>
```

Framework 30 may include a services manager 46 that manages the transfer of XML requests, data, or any other suitable information between the application 12 and other applications 12 associated with the same or a different system. Services manager 46 helps provide a peer-to-peer architecture for applications 12 to transparently access services and data associated with any other application 12. Operations manager 40 and services manager 46 may rely on communications manager 48 to actually transfer the messages using transaction layer 14, in XML over HTTP format or otherwise, between distributed applications 12.

The present invention contemplates specifying the documents 34, rules 38, and operations 42, in whole or in part, in any appropriate manner. In one embodiment, a graphical user interface (GUI) associated with framework 30 may allow developers, or perhaps domain experts and consultants who may lack more sophisticated programming skills, to readily define and manipulate these components.

Figure 3:
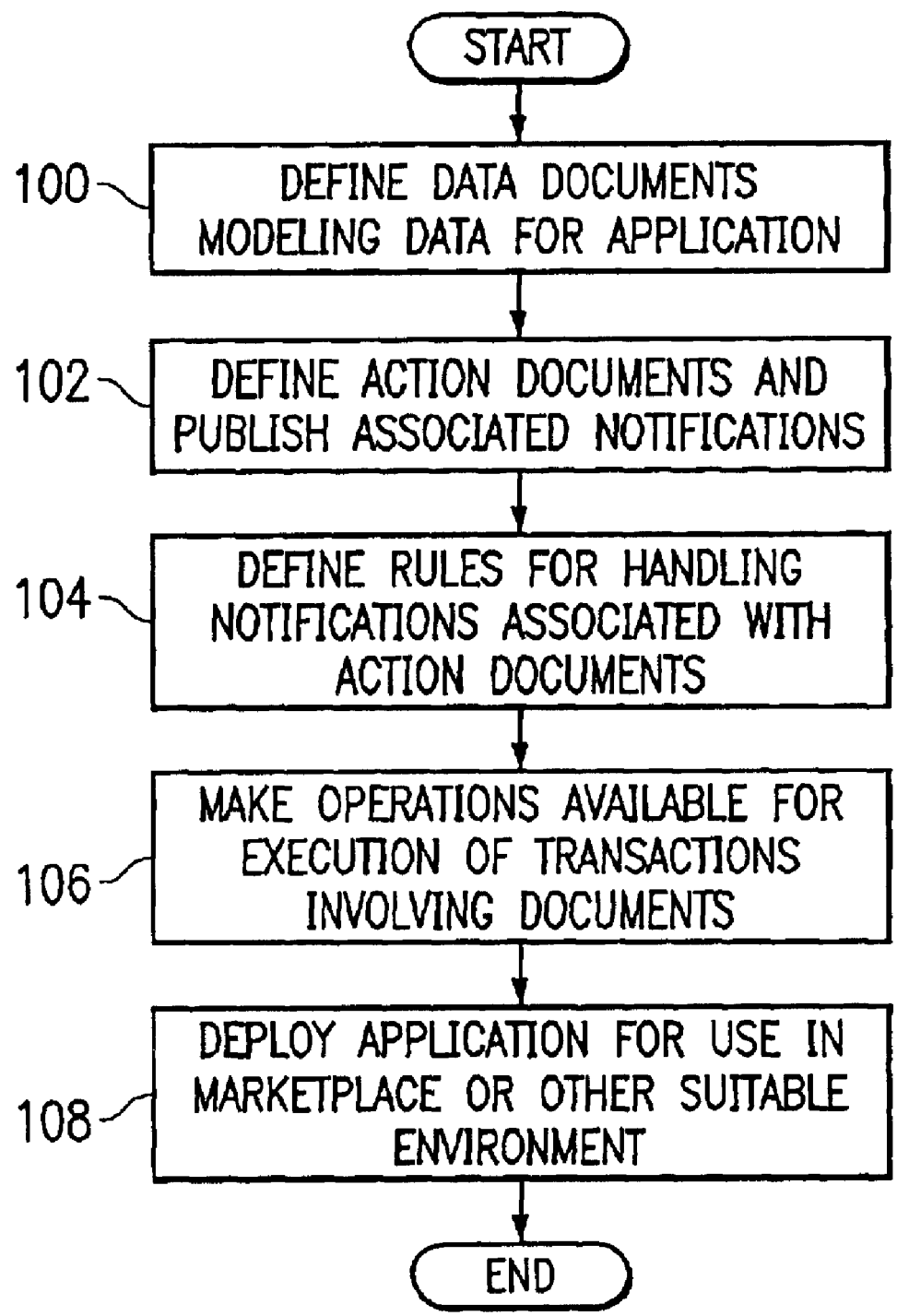
FIG. 3 illustrates an exemplary method of developing a software application using an extended XML-based framework.

FIG. 3 illustrates an exemplary method of developing application 12 using extended XML-based framework 30. In one embodiment, each of the applications 12 developed using framework 30 has its own set of documents 34, notifications, and rules 38, although one or more of these might be identical for one or more applications 12. The method begins at step 100, where the developer defines the data documents 34 for application 12, which model appropriate data associated with the application 12. This preferably includes specifying the attributes of each document 34 and its relationships with other documents 34. At step 102, the developer may define any action documents 34 for application 12 and publish the associated notifications to allow application 12 to communicate with other applications 12 or any other clients of the application 12. A published notification specification preferably identifies the name of a notification and one or more parameters that the client must supply in invoking the notification. Once published, clients of application 12 can invoke the notifications to perform appropriate tasks. For example, and without limitation, an order management application 12 may publish notifications such as "Acknowledge Order," "Advance Shipment," "Shipment Information," "Acknowledge Delivery," or any other suitable notifications.

At step 104, the developer defines rules 38 for handling notifications associated with action documents 34. As described more fully above, rules 38 specify the logic to be executed in response to a client invoking a published notification. Since more than one rule 38 may be associated with each notification, all the rules 38 associated with a notification are preferably evaluated in response to the notification being invoked. At step 106, the developer makes one or more operations 42 available for the execution of transactions involving documents 34. As described above, if operations 42 provided through framework 30 are insufficient for a particular need, then the framework 30 may allow the developer to access JAVA or any other software development capabilities to program for the particular need using traditional techniques. At step 108, application 12 is deployed for use within the electronic marketplace or other suitable environment of system 10, and the method ends.

Figure 4:
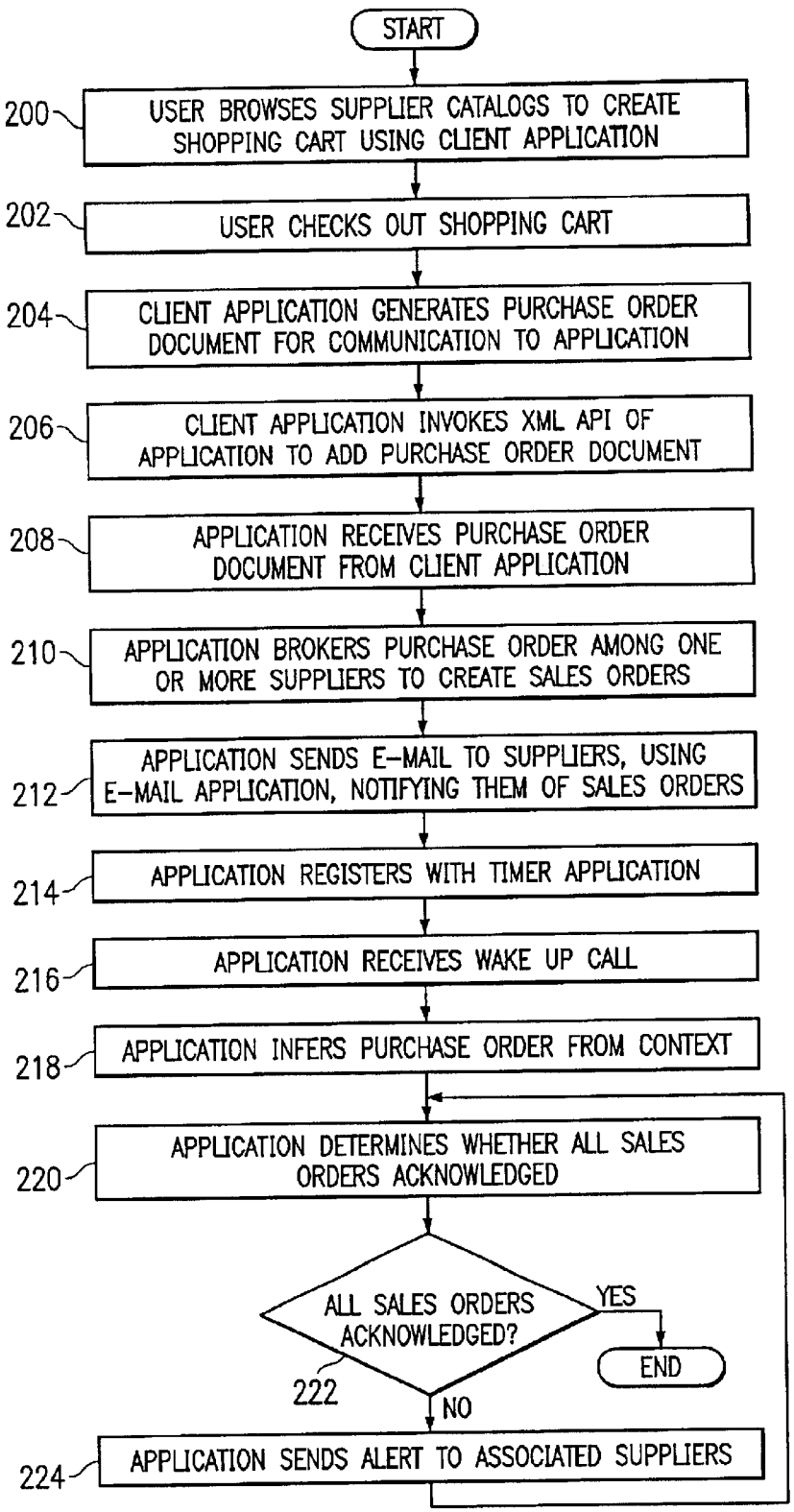
FIG. 4 illustrates exemplary execution of a software application developed using an extended XML-based framework.

FIG. 4 illustrates an exemplary method of executing an application 12 that has been developed using the extended XML-based framework 30. In this particular example, application 12 executes logic and interacts with an exemplary browse and buy client application 12 in the context of order brokering. The method begins at step 200, where an electronic marketplace user browses the catalogs of multiple suppliers using browse and buy client application 12, creating a shopping cart containing one or more items available from the suppliers. The user checks out the shopping cart at step 202, which causes the client application 12 to generate a purchase order document 34 at step 204 for communication to application 12. In this example, purchase order document 34 contains a list of line items, each including a line item identifier, a supplier of the line item, and a quantity. Purchase order document 34 also typically contains information concerning the user, shipment, payment, and the like. In a particular embodiment, the application 12 has a well-defined XML API for adding purchase order documents 34. Client application 12 then invokes the XML API at step 206 to add the purchase order document 34.

In one embodiment, a timer application 12 provides a "wake up call" service to other applications 12 that have registered with it, for example, by providing a time for the wake up, a context for the wake up, and a function to call for the wake up. The timer application 12 may poll its database periodically to determine whether it needs to make wake up calls to any other applications 12. Once timer application 12 makes a wake up call, it deletes that entry from its database and provides the context to the application 12 being awoken to allow the application 12 to act in response to the wake up call. In addition, an e-mail application 12 may receive requests to send e-mails to users. For example, each request would preferably include address information, a subject indicator, and message content. The e-mail application 12 may also provide suitable value added features such as guaranteed message delivery.

Returning to the method of FIG. 4, application 12 receives purchase order document 34 from the client application 12 at step 208 and brokers the purchase order among one or more suppliers at step 210. As described more fully above, application 12 may invoke the OnPreCreate rule associated with purchase order document 34 before saving the purchase order. As an example, as described above, the purchase order may include the following line items.

| ID  | Item    | Description | Supplier      | Quantity |
|-----|---------|-------------|---------------|----------|
| PO1 | Item001 | Desktop     | ABC Computers | 2        |
| PO1 | Item002 | Server      | XYZ Systems   | 1        |
| PO1 | Item003 | Laptop      | ABC Computers | 1        |

In this example, application 12 might break down the purchase order down by supplier to create sales orders SO-001 for ABC Computers (containing line items PO1-Item001 and PO1-Item003) and SO-002 for XYZ Systems (containing line item PO1-Item002).

At step 212, application 12 sends e-mails to the appropriate suppliers, using e-mail application 12, notifying them of the sales orders. In this example, application 12 may be required to send an alert to the user if a supplier does not acknowledge its sales order within one day. Accordingly, at step 214, application 12 may register with timer application 12 to receive a wake up call after twenty-four hours have elapsed. In one embodiment, in registering, application 12 provides the name of the notification timer application 12 needs to invoke to send the wake up call, along with "PO1" or another suitable context for the wake up call.

At step 216, when twenty-four hours have elapsed, application 12 receives the wake up call. Application 12 infers the purchase order ID ("PO1" in this case) from the context at step 218 and determines whether all sales orders have been acknowledged at step 220. If all sales orders have not been acknowledged at step 222, application 12 sends an alert to the associated supplier(s) at step 224. Otherwise, the handling of the purchase order document 34 at application 12 is complete and the method ends. As described above, application 12 may invoke the associated OnPostCreate rule once the handling of purchase document 34 is complete and the purchase order document 34 has been deleted. Although the method is described with respect to an exemplary purchase order document 34 and application 12, those skilled in the art will appreciate that the present invention encompasses all suitable documents 34 and applications 12.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A framework for developing software applications, comprising:

a document manager operable to manage activities relating to one or more XML-based data documents associated with an application, each data document modeling data associated with the application and representing relationships that may exist between the data document and one or more other data documents;

a rules manager operable to manage rules that specify logic for the handling of notifications associated with XML-based action documents received at the application, the action documents defining notifications supported by one or more applications developed using the framework, the notifications defined by the action documents requesting actions involving data documents; and an operations manager operable to manage execution of transactions involving data documents based on one or more operations defined for the application during its development;

the framework providing a generic XML-based transaction engine, the application being one of a plurality of distributed applications each being an instance of the generic transaction engine.

2. The framework of claim 1, wherein a data document may be related to another data document using an XML-based tag specified during definition of the data document.

3. The framework of claim 1, wherein at least one data document is remote from the application, the application operable to access the data document using an address specified during deployment of the application, the application operable to determine the address for the data document substantially on the fly during operation of the application.

4. The framework of claim 1, wherein the action documents are defined to expose application program interfaces (APIs) used to notify data documents.

5. The framework of claim 1, wherein each rule comprises a condition and one or more action statements, the application operable to:

receive a notification;

apply each associated rule to the notification;

execute the action statements if the condition is satisfied; and return an error if the condition is not satisfied.

6. The framework of claim 5, wherein an action statement is selected from the group consisting of:

an action statement causing a state transition;

an action statement setting an attribute of an associated document;

an action statement causing a document to be acted upon;

an action statement causing a notification to be sent to an application;

an action statement causing a message to be sent; and an action statement causing another rule to be invoked.

7. The framework of claim 1, wherein each operation is packaged in an XML-based request.

8. The framework of claim 7, wherein the request comprises at least one parent data document and one or more child data documents.

9. The framework of claim 8, wherein the parent data document comprises a purchase order and the child data documents comprise line items of the purchase order.

10. The framework of claim 1, wherein an operation is selected from the group consisting of creating a document, retrieving a document, modifying a document, and deleting a document.

11. The framework of claim 1, wherein one or more of the operations are made available through the framework during definition of associated data documents to provide a rich XML interface for interacting with these data documents.

12. The framework of claim 11, wherein the framework provides access to software development capabilities for programming for particular needs if the operations provided through the framework are insufficient to meet those needs.

13. The framework of claim 1, further comprising a services manager that manages transfer of XML-based information between the application and one or more other distributed applications.

14. The framework of claim 13, wherein the services manager helps provide a peer-to-peer architecture allowing the application to transparently access services and data associated with other distributed applications.

15. An XML-based software application, comprising:

a document manager operable to manage activities relating to one or more XML-based data documents associated with the application, each data document modeling data associated with the application and representing relationships that may exist between the data document and one or more other data documents;

a rules manager operable to manage rules that specify logic for the handling of notifications associated with XML-based action documents received at the application, the action documents defining notifications supported by the application, the notifications defined by the actions documents requesting actions involving data documents; and an operations manager operable to manage execution of transactions involving data documents based on one or more operations defined for the application during its development;

the application developed using an XML-based framework providing a generic XML-based transaction engine, the application being one of a plurality of distributed applications each being an instance of the generic transaction engine.

16. The application of claim 15, wherein a data document may be related to another data document using an XML-based tag specified during definition of the data document.

17. The application of claim 15, wherein at least one data document is remote from the application, the application operable to access the data document using an address specified during deployment of the application, the application operable to determine the address for the data document substantially on the fly during operation of the application.

18. The application of claim 15, wherein the action documents are defined to expose application program interfaces (APIs) used to notify data documents.

19. The application of claim 15, wherein each rule comprises a condition and one or more action statements, the application operable to:

receive a notification;

apply each associated rule to the notification;

execute the action statements if the condition is satisfied; and return an error if the condition is not satisfied.

20. The application of claim 19, wherein an action statement is selected from the group consisting of:

an action statement causing a state transition;

an action statement setting an attribute of an associated document;

an action statement causing a document to be acted upon;

an action statement causing a notification to be sent to an application;

an action statement causing a message to be sent; and an action statement causing another rule to be invoked.

21. The application of claim 15, wherein each operation is packaged in an XML-based request.

22. The application of claim 21, wherein the request comprises at least one parent data document and one or more child data documents.

23. The application of claim 22, wherein the parent data document comprises a purchase order and the child data documents comprise line items of the purchase order.

24. The application of claim 15, wherein an operation is selected from the group consisting of creating a document, retrieving a document, modifying a document, and deleting a document.

25. The application of claim 15, wherein one or more of the operations are made available through the framework during definition of associated data documents to provide a rich XML interface for interacting with these data documents.

26. The application of claim 15, further comprising a services manager that manages transfer of XML-based information between the application and one or more other distributed applications.

27. The application of claim 26, wherein the services manager helps provide a peer-to-peer architecture allowing the application to transparently access services and data associated with other distributed applications.

28. An electronic marketplace, comprising:

a distributed transaction layer; and a plurality of distributed XML-based software applications developed using an XML-based framework which provides a generic XML-based transaction engine, each application being an instance of the generic transaction engine, the applications operable to interact with one another using the distributed transaction layer to conduct electronic commerce within the marketplace, each application comprising:

a document manager operable to manage activities relating to one or more XML-based data documents associated with the application, each of the data documents modeling data associated with the application and representing relationships that may exist between the data document and one or more other data documents;

a rules manager operable to manage rules specifying logic for handling notifications associated with XML-based action documents received at the application, the action documents defining notifications supported by the application, the notifications defined by the action documents requesting actions involving data documents; and an operations manager operable to manage the execution of transactions involving data documents based on one or more operations defined for the application during its development.

29. The marketplace of claim 28, wherein the distributed transaction layer provides communications between the applications in XML over HTTP format.

30. A method of developing a software application using an XML-based application development framework, comprising:

using the framework, providing a document manager to manage activities relating to one or more XML-based data documents associated with the application, each data document modeling data associated with the application and representing relationships that may exist between the data document and one or more other data documents;

using the framework, providing a rules manager to manage rules that specify logic for the handling of notifications associated with XML-based action documents received at the application, the action documents defining notifications supported by the application developed using the framework, the notifications defined by the action documents requesting actions involving data documents; and using the framework, providing an operations manager to manage execution of transactions involving data documents based on one or more operations defined for the application during its development;

the framework providing a generic XML-based transaction engine, the application being one of a plurality of distributed applications each being an instance of the generic transaction engine.

31. The method of claim 30, wherein a data document may be related to another data document using an XML-based tag specified during definition of the data document.

32. The method of claim 30, wherein at least one data document is remote from the application, the application accessing the data document using an address specified during deployment of the application, the application determining the address for the data document substantially on the fly during operation of the application.

33. The method of claim 30, wherein the action documents are defined to expose application program interfaces (APIs) used to notify data documents.

34. The method of claim 30, wherein each rule comprises a condition and one or more action statements, the application:

receiving a notification;

applying each associated rule to the notification;

executing the action statements if the condition is satisfied; and returning an error if the condition is not satisfied.

35. The method of claim 34, wherein an action statement is selected from the group consisting of:

an action statement causing a state transition;

an action statement setting an attribute of an associated document;

an action statement causing a document to be acted upon;

an action statement causing a notification to be sent to an application;

an action statement causing a message to be sent; and an action statement causing another rule to be invoked.

36. The method of claim 30, wherein each operation is packaged in an XML-based request.

37. The method of claim 36, wherein the request comprises at least one parent data document and one or more child data documents.

38. The method of claim 37, wherein the parent data document comprises a purchase order and the child data documents comprise line items of the purchase order.

39. The method of claim 30, wherein an operation is selected from the group consisting of creating a document, retrieving a document, modifying a document, and deleting a document.

40. The method of claim 30, wherein one or more of the operations are made available through the framework during definition of associated data documents to provide a rich XML interface for interacting with these data documents.

41. The method of claim 40, further comprising providing access to software development capabilities for programming for particular needs if the operations provided through the framework are insufficient to meet those needs.

42. The method of claim 30, further comprising using the framework to provide a services manager to manage transfer of XML-based information between the application and one or more other distributed applications.

43. The method of claim 42, wherein the services manager helps provide a peer-to-peer architecture allowing the application to transparently access services and data associated with other distributed applications.

44. A method of conducting electronic commerce using a plurality of XML-based software applications, comprising:

using a document manager of a first application associated with an electronic marketplace, managing activities relating to one or more XML-based data documents associated with the first application, each data document modeling data associated with the first application and also representing relationships that may exist between the data document and one or more other data documents;

using a rules manager of the first application, managing rules that specify logic for the handling of notifications associated with XML-based action documents received at the first application, the action documents defining notifications supported by the first application, the notifications defined by the action documents requesting actions involving data documents; and using an operations manager of the first application, managing the execution of transactions involving data documents based on one or more operations defined for the first application during its development;

the first application developed using a framework providing a generic XML-based transaction engine, the first application being one of a plurality of distributed applications each being an instance of the generic transaction engine.

45. The method of claim 44, wherein a data document may be related to another data document using an XML-based tag specified during definition of the data document.

46. The method of claim 44, wherein at least one data document is remote from the application, the application accessing the data document using an address specified during deployment of the application, the application determining the address for the data document substantially on the fly during operation of the application.

47. The method of claim 44, wherein the action documents are defined to expose application program interfaces (APIs) used to notify data documents.

48. The method of claim 44, wherein each rule comprises a condition and one or more action statements, the application:

receiving a notification;

applying each associated rule to the notification;

executing the action statements if the condition is satisfied; and returning an error if the condition is not satisfied.

49. The method of claim 48, wherein an action statement is selected from the group consisting of:

an action statement causing a state transition;

an action statement setting an attribute of an associated document;

an action statement causing a document to be acted upon;

an action statement causing a notification to be sent to an application;

an action statement causing a message to be sent; and an action statement causing another rule to be invoked.

50. The method of claim 44, wherein each operation is packaged in an XML-based request.

51. The method of claim 50, wherein the request comprises at least one parent data document and one or more child data documents.

52. The method of claim 51, wherein the parent data document comprises a purchase order and the child data documents comprise line items of the purchase order.

53. The method of claim 44, wherein an operation is selected from the group consisting of creating a document, retrieving a document, modifying a document, and deleting a document.

54. The method of claim 44, wherein one or more of the operations are made available through the framework during definition of associated data documents to provide a rich XML interface for interacting with these data documents.

55. The method of claim 44, further comprising using a services manager to manage transfer of XML-based information between the application and one or more other distributed applications.

56. The method of claim 55, wherein the services manager helps provide a peer-to-peer architecture allowing the application to transparently access services and data associated with other distributed applications.

57. An XML-based software application, comprising:

means for managing activities relating to XML-based data documents associated with the application, each data document modeling data associated with the application and representing relationships that may exist between the data document and one or more other data documents;

means for managing rules specifying logic for handling notifications associated with XML-based action documents that are received at the application, the action documents defining notifications supported by the application, the notifications defined by the action documents requesting actions involving data documents; and means for managing execution of transactions involving data documents, based on one or more operations defined for the application during its development;

the application developed using an XML-based framework providing a generic XML-based transaction engine, the application being one of a plurality of distributed applications each being an instance of the generic transaction engine.

* * * * *